Feb. 6, 1968  L. S. CHADWICK II  3,367,204
GEAR SELECTOR MECHANISM
Filed Aug. 2, 1965  3 Sheets-Sheet 1
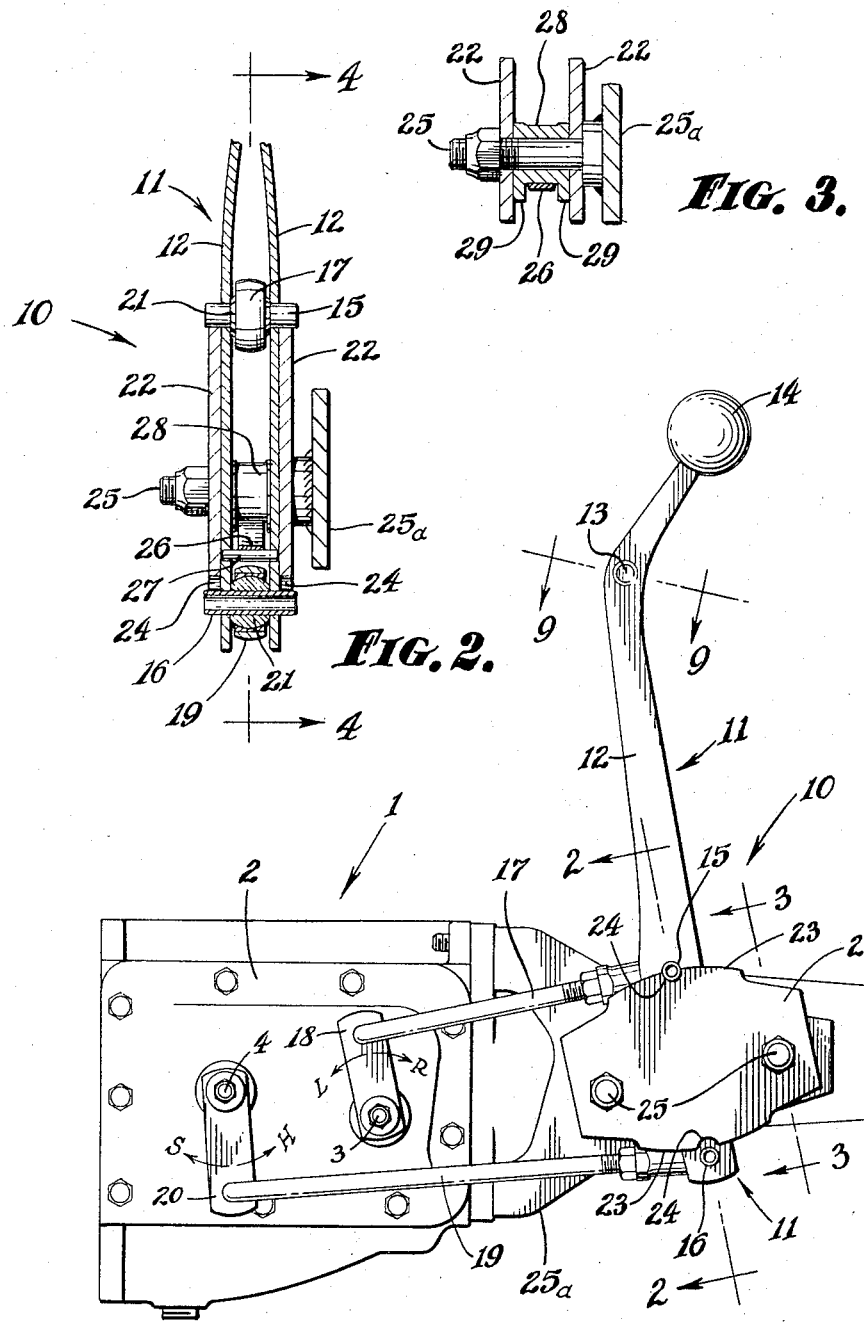
INVENTOR.
LEE S. CHADWICK II
BY
Harvey E. Bumgardner Jr.
ATTORNEY

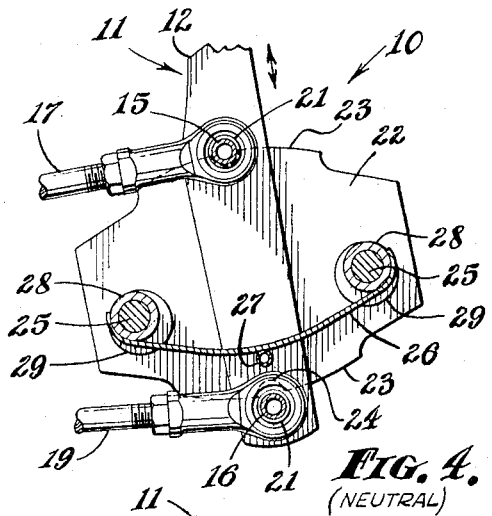
FIG. 4. (NEUTRAL)
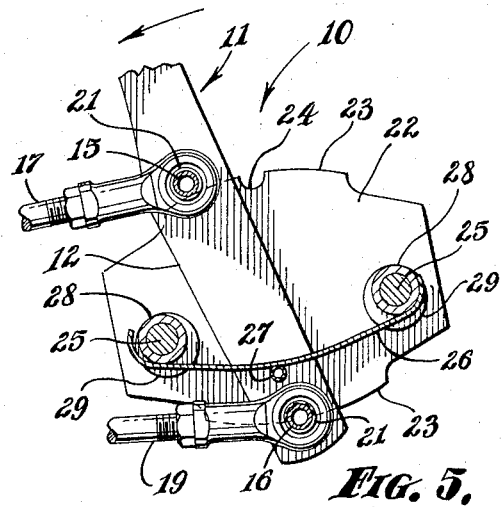
FIG. 5. (LOW)
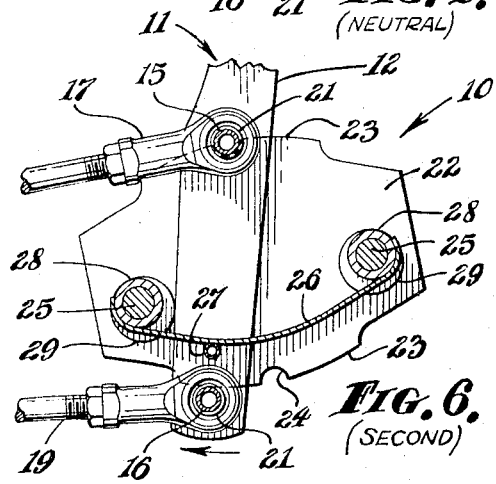
FIG. 6. (SECOND)
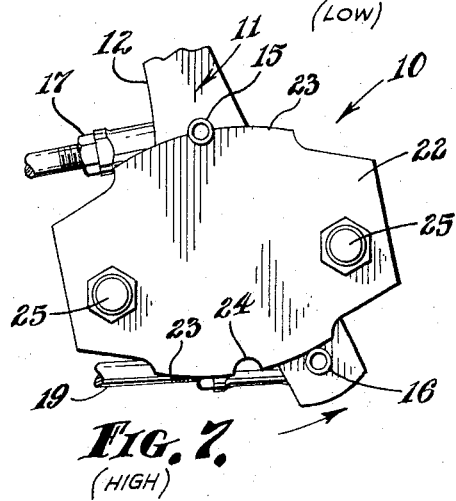
FIG. 7. (HIGH)
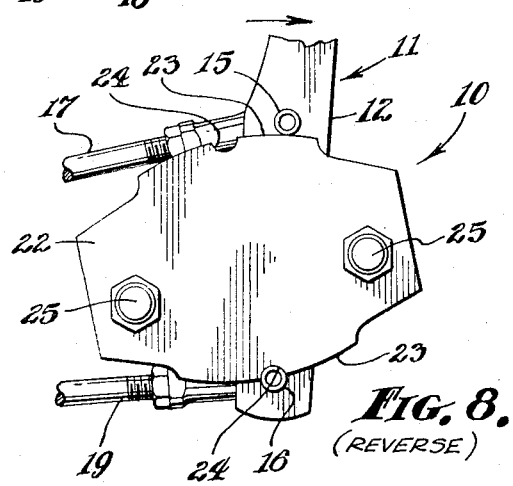
FIG. 8. (REVERSE)
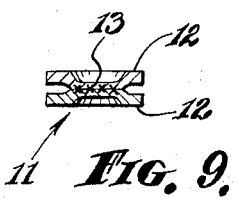
FIG. 9.
INVENTOR.
LEE S. CHADWICK II
BY Harvey E Bumgardner Jr.
ATTORNEY

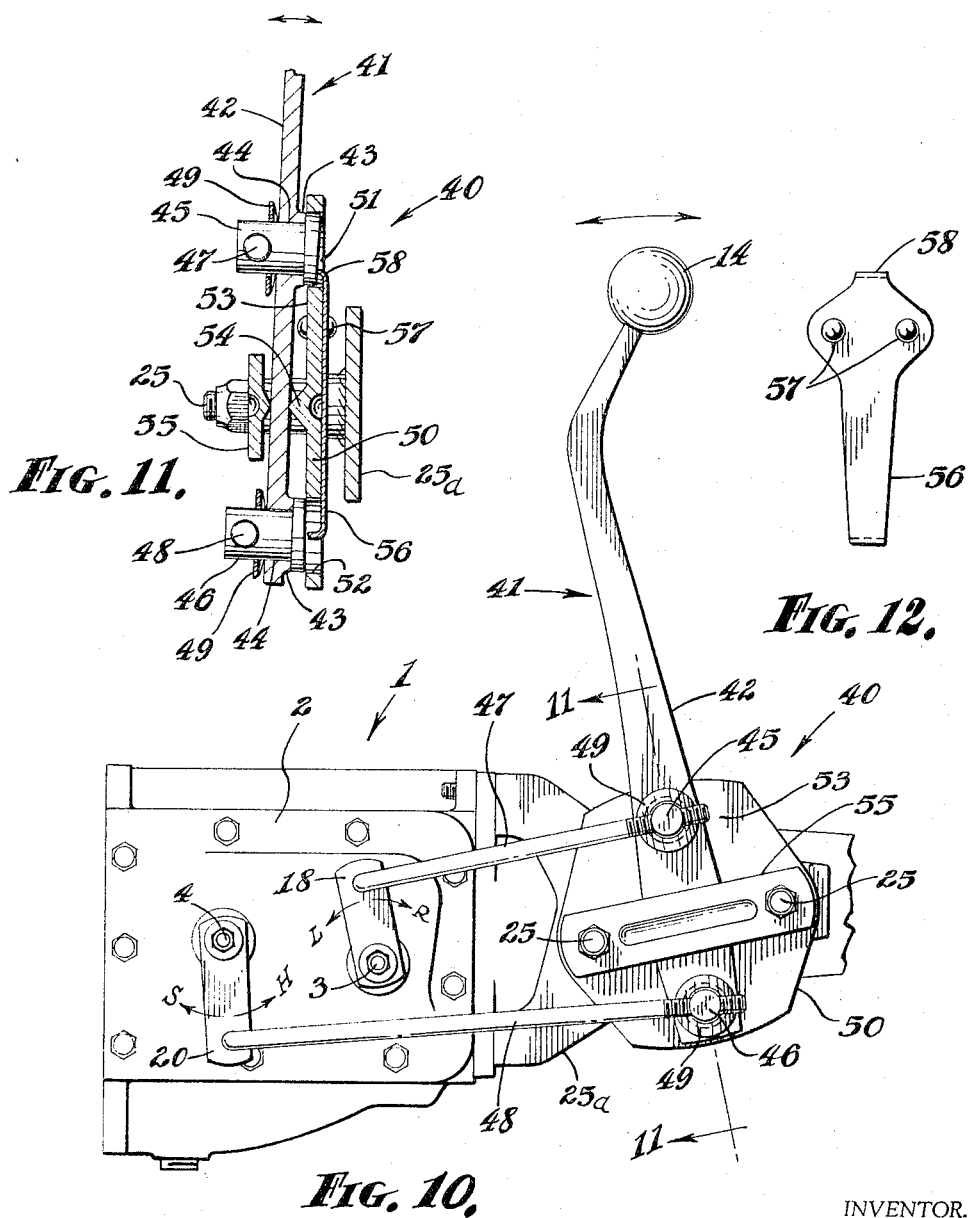

United States Patent Office 3,367,204
Patented Feb. 6, 1968

3,367,204
GEAR SELECTOR MECHANISM
Lee S. Chadwick II, R.F.D. 4, St. Albans, Vt. 05478
Filed Aug. 2, 1965, Ser. No. 476,256
8 Claims. (Cl. 74—477)

ABSTRACT OF THE DISCLOSURE

A gear selector mechanism for a power plant transmission having at least two gear systems each movable from a neutral setting to either of two operating settings, the mechanism including a lever movable in a plane and provided with two spaced detents linked, respectively, to the two gear systems, whereby each detent has positions corresponding to neutral and each of two drive settings, and a fixed plate provided with two spaced guide surfaces to guide the movement of the respective detents, each guide surface having a central recess corresponding to the neutral setting of the gear system linked to the detent guided thereby, the recesses and detents being so spaced that one detent will always be locked in neutral position.

---

This invention relates to a new and improved type of transmission gear selector mechanism whereby the operator, by direct manual or other force applied to a selector lever, may operably select a gear setting from any of four drive settings and a neutral setting in a power plant transmission. More particularly, it relates to a gear selector mechanism for a three or four forward speed automotive transmission which permits rapid shifting of gear ratios while, by means of the gear selector mechanism itself, absolutely preventing the occurrence of a "locked transmission" condition.

All present standard automotive transmissions of the three or four forward speed types are integrally provided with two separate gear systems each capable of being moved from a neutral setting to either of two drive settings by means of its own input shaft or other mechanical linkage, extending exterior of the transmission housing and design to be operably connected to a gear selector mechanism. In a three forward speed transmission, one of these systems (the "low range" system) is conventionally intended to be displaceable from neutral position to either reverse drive position or first (low) forward drive position while the other (the "high range" system) is displaceable from neutral position to either second or third (high) forward drive position. In a conventional four forward speed transmission, the first or low range system is displaceable from neutral position to either the first or second forward drive position while the other or high range system is displaceable from neutral position to either the third or fourth forward drive position, a reverse drive setting being provided by the displacement of an additional system.

In either case, since the two gear systems are independently movable, there would, in the absence of means to prevent it, exist the possibility of displacing both systems into a drive position simultaneously with attendant disastrous results. Accordingly, all conventional three and four forward speed transmissions are provided with system interlock means, within the transmission and not forming part of this invention, for preventing either system from being displaced from neutral while the other is in a drive position. It is, however, characteristic of all such transmission system interlock means that they do not become operative to lock one system in neutral until the other leaves neutral. Accordingly, when both systems are at neutral either system is free to move from neutral.

Considering now the various gear selector mechanisms heretofore employed in conjunction with such transmissions to comprise a complete gear shift mechanism, each of these selector mechanisms, as for example those disclosed in United States Patents Nos. 2,961,890, 3,018,-670, 3,049,023, and 3,057,222, include a gear selector lever which may selectively engage and move from a position corresponding to a neutral setting of the transmission either of two actuating members respectively connected by suitable linkages to the two gear systems of the transmission, the transfer of engagement of the selector lever between actuating members being capable of accomplishment only when the actuating members are suitably relatively positioned. It is characteristic of each of the aforementioned gear selector mechanisms as well as other heretofore similarly utilized selector mechanisms that, when the selector lever has selectively engaged either of the actuating members, the other actuating member is free to move from neutral position, and this is true even when both actuating members are at neutral position. Such gear selector mechanisms are, therefore, dependent upon the transmission system interlock means to prevent both actuating members from being displaced simultaneously from neutral position. It will be seen, therefore, that, in a complete gear shift mechanism including any of the gear selector mechanisms heretofore in common use, while the gear selector lever has engaged one of the actuating members of the selector mechanism and is still at neutral position the other may be moved from neutral position thus activating the transmission system interlock means. This results in a condition known as "locked transmission" or "locked shift" wherein it is impossible to move the gear selector lever or to shift the transmission gears from the operator's position in the vehicle. The transmission system interlock means prevents the movement of the actuating member engaged by the selector lever, and the displacement of the other actuating member from neutral prevents its being engaged by the selector lever which is still at neutral. While such a shift mechanism may theoretically become locked during any intersystem shift, the condition is particularly prone to occur in the course of the intersystem shift during rapid acceleration, as in racing. This would be the low-second shift in a three forward speed transmission and the second-third shift in a four forward speed transmission. The low range transmission gear engagement system, comprised of the low range actuating member, linkage and gear system, is simply caused by its own inertia to overshoot neutral once it has been disengaged by the selector lever and before the high range transmission gear engagement system, comprised of the high range actuating member, linkage and gear system, can be moved from neutral position to actuate the transmission system interlock.

Accordingly, it is an object of the present invention to provide a gear selector mechanism which will eliminate the possibility of a locked shift mechanism during any intersystem shift.

It is a further object of this invention to provide a gear selector mechanism which will positively prevent the displacement of either transmission gear system from neutral when the other system is selectively engaged for shifting even though the engaged system is still in the neutral position.

A further object of this invention is to provide a gear selector mechanism which will positively stop the low range gear system of the transmission at neutral during the intersystem acceleration shift.

It is a still further object of this invention to provide a gear selector mechanism wherein at least one transmission gear engagement system is, at all times during intersystem shifts, prevented from moving from its neutral position.

A still further object of this invention is to provide a gear selector mechanism wherein overlapped locking of the gear engagement systems occurs during the neutral transition of intersystem shifts, the formerly moved system locking before the later moved system can unlock.

Another object of this invention is to provide a rugged gear selector mechanism particularly suited to high speed acceleration wherein the shocks of high force shifts are largely borne by the gear selector mechanism rather than by the transmission.

Another object of this invention is to provide a gear selector mechanism wherein a greater mechanical advantage will exist in the movement of the low range transmission gear system than in the movement of the high range transmission gear system.

Yet another object of this invention is to provide a gear selector mechanism including a selector lever for use in conjunction with a transmission having at least two gear systems each of which is linked to the fulcrum about which said lever must be rotated to displace the other system from neutral.

Still another object of this invention is to provide a fully independent gear selector mechanism, specifically, one that functions independently of the frail interlock system conventionally disposed within the transmission case.

For a better understanding of the present invention together with other and further objects thereof, reference is had to the following description, taken in conjunction with the accompanying drawings, and its scope will be pointed out in the appended claims.

In the drawings:

FIG. 1 is an elevational view of a preferred form of the invention shown in a neutral position and operably connected to a vehicle transmission.

FIG. 2 is a fragmentary sectional view taken on line 2—2 of FIG. 1.

FIG. 3 is a sectional view taken on line 3—3 of FIG. 1.

FIG. 4 is a sectional view taken on line 4—4 of FIG. 2.

FIG. 5 is a sectional view similar to FIG. 4 showing this form of the invention in a position corresponding to low forward gear in a three forward speed transmission.

FIG. 6 is a sectional view similar to FIG. 5 showing this form of the invention in a position corresponding to second gear.

FIG. 7 is a fragmentary elevational view similar to FIG. 6 showing this form of the invention in high gear.

FIG. 8 is a view similar to FIG. 7 showing this form of the invention in reverse gear.

FIG. 9 is a sectional view taken on line 9—9 of FIG. 1.

FIG. 10 is an elevational view similar to FIG. 1 of an alternative form of the invention shown in a neutral position.

FIG. 11 is a fragmentary sectional view taken on line 11—11 of FIG. 10.

FIG. 12 is an elevational view of the spring shown in section in FIG. 11.

Referring now to the drawings, wherein like reference numerals denote corresponding parts throughout the several views, and particularly to FIGS. 1–4 and 9, a preferred form of the invention is shown in a neutral position and operably connected to a vehicle transmission 1 which, for purposes of describing the invention will be designated a conventional three forward speed transmission having a neutral setting, a reverse drive setting and low, second and high forward drive settings. Extending exterior of the transmission housing 2 are shafts 3 and 4 which are connected, respectively, to the low range transmission gear system and the high range transmission gear system. The low range shaft 3, when rotated clockwise from the neutral position shown, causes the transmission 1 to engage in reverse drive setting and, when rotated counterclockwise, causes the transmission 1 to engage in low forward drive setting. The high range shaft 4, when rotated clockwise from the position shown, causes the transmission 1 to engage in second forward drive setting and, when rotated counterclockwise, causes the transmission 1 to engage in high forward drive setting.

In the embodiment shown in FIGS. 1–9, the gear selector mechanism 10 comprises selector means in the form of a gear selector lever 11 which is formed from the two strips 12 joined together by the resistance weld 13 and surmounted by the handle 14 which may be manually manipulated by the vehicle operator. Fixedly connected to the selector lever 11 by being press fit in holes therein are two actuating members 15 and 16 in the form of detents or tubular pins having, in the embodiment shown, equal diameters. The first or upper detent 15 is operably linked to the low range transmission shaft 3 by the rod 17 and crank 18 while the second or lower actuating member 16 is operably linked to the high range transmission shaft 4 by the rod 19 and crank 20, suitable bearings 21 being interposed between the rods 17 and 19 and the detents 15 and 16 to permit the rotation of the former about the latter. It is to be noted that the actuating means 15 and 16 are spaced apart in the plane of movement of the selector lever 11, so that, if either one of the actuating means 15 and 16 were locked or fixed in position except for rotational movement, the other could be rotated about it by the movement of the selector lever 11, the "fixed" actuating member 15 or 16 serving as the fulcrum of the lever 11 in the movement of the other.

The movement of the selector lever 11 and actuating members 15 and 16 is limited by the two spaced parallel guide members 22 each of which are provided with two opposed arcuate guide surfaces 23 having a centrally disposed semi-circular recess 24. Each of the recesses 24 have radii substantially equal to one half the diameter of the detents 15 and 16 and the radius of each guide surface 23 is substantially equal to the center to center distance between the detents 15 and 16 less one half the diameter of said detents. The guide members 22 are fixedly mounted relative to each other and relative to the transmission 1 by means of the studs 25 affixed to the mounting bracket 25a which, in turn, is bolted to the transmission housing 2.

Referring now particularly to FIGS. 4–8, the gear selector mechanism 10 is shown in a neutral position. It will be noted that both detents 15 and 16 are aligned with the recesses 24 and that the uppermost or low range detent 15 is fully engaged in the upper recess leaving the lower or high range detent 16 free to be moved in either direction along the lower guide surface 23. The lever 11 and detents 15 and 16 are urged into this neutral position by the spring 26 which bears against the loading pin 27 attached to the lever 11.

To shift the selector mechanism into a position corresponding to a low forward drive setting of the transmission as shown in FIG. 5, the lever 11 and actuating members 15 and 16 are first raised so that the high range actuating member 16 becomes fully engaged by the lower recess 24 and the low range actuating member 15 is free to move along the upper guide surface 23. It will be observed that during this transition neither actuating member will be free to rotate about the other because neither will be fully disengaged from its recess 24. Upon full engagement of the actuating member 16 by the lower recess 24 the low range actuating member 15 is rotated counterclockwise about the high range actuating member 16, the latter serving as the fulcrum for the selector lever 11, to the position shown in FIG. 5. Simultaneously the linkage comprised of the rod 17 and the crank 18 has caused the transmission 1 to be shifted into low gear. It will be observed that, during this shift, from the moment the high range actuating member 16 leaves the position shown in FIG. 4, it is "locked" in the sense that while rotational movement is permitted in addition to the limited upward movement necessary to disengage the low range actuating member 15 from the upper recess 24, no significant lateral movement is permitted such as would materially move the high range gear system in the transmission thereby to activate the transmission interlock. Also, once the low range actuating member 15 is displaced from the neutral position, the high range actuating member 16 is prevented from becoming disengaged from the lower recess 24.

The shift from low gear (FIG. 5) to second gear (FIG. 6) is accomplished by pulling the lever 11 towards the operator, that is, to the right as shown in the drawings. As this shift is commenced, the lever 11 rotates about the fulcrum formed by the detent 16 engaged by the lower recess 24 until the detent 15 becomes aligned with the upper recess 24 at which time both transmission gear systems are neutral. At this point in the shift, the force exerted by the spring 26 on the loading pin 27 forces the actuating lever 11 and detents 15 and 16 into the neutral position shown in FIG. 4. This is accomplished in a smooth rolling path of travel as the circular cross-sectioned detent 15 slides into the upper recess 24. It should be appreciated that this same intersystem movement might be accomplished without the aid of the spring 26 by the operator simply exerting, in the embodiment shown, a downward pressure on the handle 14 of the lever 11 as he draws it towards himself, but the spring urging has been found helpful particularly in rapid acceleration shifts. As the operator continues to pull the lever 11 to the rear from the neutral position shown in FIG. 4, it will be noted that the fulcrum of the lever 11 has shifted to the low range detent 15 now fully engaged by the upper recess 24 while the high range detent 16 rotates about this fulcrum along the lower guide surface 23 to the position shown in FIG. 6 when the lever 11 comes to rest against the eccentric adjustable stop 28. It is the function of the stop 28 to sustain the impact of the other high force intersystem shift from low to second so that the same will not be transmitted to the transmission 1 itself.

It will be noted that, particularly with reference to low-second shift, utilizing my inventive gear selector mechanism 10, there is no possibility of a locked shift condition developing. Since both actuating members 15 and 16 are at all times attached to the selector lever 11, neither the high range transmission gear system nor the low range transmission gear system may move independently of the selector lever 11. Additionally, it has been seen that at least one of the actuating members 15 and 16 will at all times be "locked" (except for rotation and inconsequential transverse "play"), it being necessary that one such actuating member be fully engaged or locked in neutral position in order for the other to move from neutral. During the transition from the high range locked condition to the low range locked condition both actuating members 15 and 16 are temporarily locked in neutral position.

The second-high shift from the position shown in FIG. 6 to the position shown in FIG. 7 is accomplished by the operator simply moving the lever 11 away from him (counterclockwise as shown in the drawings). The low range actuating member 15 remains engaged by the upper recess 24 throughout this shift, the selector mechanism 10 moving through the neutral position shown in FIG. 4. As in the case of the low-second shift (FIG. 6), the movement of the second-high shift is arrested and its impact absorbed by an adjustable stop 28. The stops 28, which comprise tubular sleeves provided with eccentric portions 29, may be adjusted to absorb all of the impact of the lever 11 together with the momentum of the high range transmission gear system to which the lever 11 is linked while at the same time permitting complete engagement of the transmission gears by rotating them about the studs 25 until proper adjustment is attained.

The shift from the neutral position shown in FIG. 4 into the position shown in FIG. 8 corresponding to the reverse drive transmission setting is made by the operator lifting the lever 11, as in shifting to low forward drive, until the high range detent 16 is fully engaged by the lower recess 24 and the low range detent is free to move along the upper guide surface 23. Then, utilizing the high range detent 16 as a fulcrum, the lever 11 is pulled towards the operator (rotated clockwise as shown in the drawings). The lever 11 does not engage the stops 28 in either the reverse or low forward drive shifts, and no additional stops are provided for these shifts because they are not generally high impact shifts, both being accomplished when the vehicle is at rest.

It will be observed from the foregoing description of the functioning of a preferred embodiment of my invention that, when the low range transmission gear system is being moved, the fulcrum of the selector lever 11 is at the high range detent 16, and the low range transmission gear system is moved by second class leverage. Conversely, when the high range transmission gear system is being moved, the fulcrum of the lever 11 has been shifted to the low range detent 15, and the high range transmission gear system is moved by first class leverage. Thus, the lever 11 has a greater mechanical advantage when moving the low range system than when moving the high range system. Since all three forward speed and some four forward speed transmissions are provided with a low range gear system substantially heavier than the high range gear system, there is an obvious advantage in this arrangement.

FIGS. 10–12 depict an alternative form of the invention which, though different in design, embodies the same central inventive features. This alternative gear selector mechanism 40, which is adapted for use in conjunction with the same three forward drive setting transmission 1 heretofore described, comprises a modified gear selector lever 41 formed of a single bar 42 provided with two circular bosses 43. A circular hole 44 extending through the bar 42 is provided in the center of each boss 43. Inserted through the uppermost hole 44 is the low range actuating member 45 while inserted through the lowermost hole 44 is the high range actuating member 46. The low range actuating member 45 and the high range actuating member 46 are, respectively, linked to the transmission 1 by the rods 47 and 48 connected, respectively, to the cranks 18 and 20, the actuating members 45 and 46 being fixed with respect to the lever 41 except for rotational movement in the holes 44 by the spring washers 49 interposed between the rods 47 and 48 and the bar 42.

A single guide member 50 provides the means to alternatively engage and "lock," except for rotational movement, the actuating members 45 and 46 in neutral position and to guide the movement of the actuating member not so engaged about the other as a fulcrum for the lever 41. The guide member 50 is provided with a first locking means or hole 51 suitably sized and shaped to engage the low range actuating member 45 and a second such locking means or hole 52 to engage the high range actuating member 46. The actuating member not so engaged slides on the guide surface 53 during shifts from neutral position. Since the lever 41 in this alternative gear selector mechanism 40 must be transversely pivoted rather than lifted in intersystem shifts, a third fulcrum for the lever 41 is provided by the projection 54 on the guide member 50 and the fulcrum piece 55 mounted on the studs 25. A leaf spring 56 affixed to the guide member 50 by the rivets 57 provides the dual function of urging disengagement of the high range actuating member 46 when the selector lever 41 reaches neutral position (as shown in the drawings) during rapid forward acceleration shifts and, by the stop projection 58, limiting the insertion of the low range actuating member 45 in the hole 51.

As will be seen from an inspection of the drawings, the only functional difference between the embodiments 10 and 40 of the invention illustrated is that the first embodiment 10 has a vertical H shift pattern, the lever 11 being lifted or depressed in the neutral position, manually or by spring urging, in intersystem shifts, while the second embodiment 40 has a horizontal H shift pattern, the lever 41 being pivoted transversely in the neutral position, manually or by spring urging, in intersystem shifts. Each selector lever 11 and 41 is provided with two equivalent actuating members 15–16 and 45–46, no more than one of which may leave neutral position at any given time and each of which provides a fulcrum for the movement of the other from neutral by engagement in the locking means 24 and 51–52. Additionally, during the transition, in neutral, from one transmission gear system to the other, both systems are locked and prevented from leaving neutral setting until one system has been positively selected for drive engagement and the other has become fully engaged or locked at neutral position.

While two preferred forms of the invention have been shown and described herein, it will be appreciated that this is for the purpose of illustration, and that modifications and changes may be made therein without departing from the spirit and scope of the invention. For example, either of the embodiments shown herein is susceptible of inversion, that is, in the first embodiment 10, the lever 11 could be provided with recesses on a suitable arcuate surface and two suitable fixed pins could be provided for alternative engagement of the recesses. The lever 11 being linked to the respective transmission gear systems in the region of the recesses, said recesses would serve as the actuating members. Similarly, the invention could be remotely operated as by a mechancal steering column shift linkage or an electrically actuated solenoid system. Also, the invention is directly suited to four forward drive setting transmissions as previously described, and the adaptation thereof to high acceleration shifts will be readily understood by one skilled in the art.

Having thus described my invention, what I claim and desire to protect by Letters Patent is:

1. A transmission gear selector mechanism designed to be operably connected to a power plant transmission having at least two gear systems each movable from a neutral setting to either of two drive settings, said selector mechanism comprising: a gear selector lever movable in at least one plane; two actuating members fixedly connected to said lever and spaced in a plane of movement thereof, said actuating members being designed to be operably linked, respectively, to said gear systems of said transmission, whereby each said actuating member has positions corresponding to neutral and either of two drive settings; and fixed locking means for selectively engaging at least one of said actuating members in neutral position at all times, whereby only one actuating member may be moved from neutral toward a drive position at any time.

2. A transmission gear selector mechanism adapted to be operably connected to a power plant transmission having at least four drive settings and a neutral setting, said transmission being provided with a low range gear system and a high range gear system, said gear selector mechanism comprising: a high range actuating member and a low range actuating member operably linked, each by a suitable linkage, to said high range and low range gear systems respectively; a movable gear selector lever; said actuating members being fixed to said lever and being spaced from each other in a plane of movement of said lever; and fixed locking means for selectively engaging either of said actuating members to form a fulcrum for said lever about which said lever and said actuating member not selectively engaged may be moved to shift the gear system to which said last mentioned actuating member is linked into either of two drive settings; at least one of said actuating members being locked in neutral position at all times.

3. A transmission gear selector mechanism comprising: first and second actuating means each movable from a neutral position to two oppositely displaced operating positions corresponding to a different one of four drive settings of said transmission; fixed locking means for engaging either of said actuating means to prevent its movement from neutral position; and selector means for selectively causing either said actuating means to become so engaged and for selectively moving the actuating means not so engaged from neutral to either of its displaced operating positions; said fixed locking means including means for preventing both actuating means from moving from neutral position until one actuating means has been fully engaged by said locking means.

4. A transmission gear selector mechanism comprising: first and second actuating means each movable from a neutral position to two oppositely displaced operating positions corresponding to a different one of four drive settings of said transmission; fixed locking means for engaging either of said actuating means to prevent its movement from neutral position; and selector means for selectively causing either said actuating means to become so engaged and for selectively moving the actuating means not so engaged from neutral to either of its displaced operating positions; said fixed locking means including means for preventing both actuating means from moving from neutral position until one actuating means has been fully engaged by said locking means; said fixed locking means including additional means for preventing the disengagement of either actuating means when the other is displaced from neutral position.

5. A transmission gear selector mechanism adapted to be operably connected to a power plant transmission having at least four drive settings and a neutral setting, said transmission being provided with first and second transmission shifting means each movable from an intermediate position corresponding to said neutral setting to either of two oppositely displaced positions each corresponding to one of said drive settings, said gear selector mechanism comprising: at least one fixed planar member provided with two locking means spaced apart in the plane of said member; and a selector lever movable parallel to the plane of said planar member; said selector lever being provided with two engaging means adapted respectively to engage said locking means; said selector lever being connected to said transmission shifting means by first and second linkages respectively attached to said lever substantially at the loci of said engaging means and to said first and second transmission shifting means; said lever being movable from a position corresponding to neutral only when one of said engaging means has been fully engaged by its corresponding locking means to provide a fulcrum about which said lever may rotate and to prevent the engaged engaging means from leaving neutral position.

6. In combination with a power plant transmission having at least four drive settings, at least three of which are forward drive settings, and having additionally a neutral setting, said transmission being provided with at least two transmission shifting means thereon each shiftable from an intermediate position corresponding to said neutral setting to either of two oppositely displaced positions, a first said transmission shifting means being operable to shift said transmission into the low forward drive setting and a second transmission shifting means being operable to shift said transmission into an intermediate forward drive setting and the high forward drive setting, means for shifting said transmission shifting means comprising: at least one fixed planar guide member provided with two guide surfaces each having a centrally disposed recess therein; a lever movable parallel to the plane of said guide member; said lever being provided with two spaced detent means each adapted to fit into one of said recesses; said detent means being so spaced that only when either detent means is fully engaged by one of said recesses is the other detent means free to move with respect to the guide surface opposed to said recess; and two linkages separately connected to said lever substantially at the locus of each of said detent means and connected respectively to said first and second transmission shifting means.

7. A transmission gear selector mechanism for use in combination with a vehicle transmission having three forward drive settings and one reverse drive setting and a neutral setting, said transmission being provided with a first transmission shifting means, movable from an intermediate position corresponding to said neutral setting to oppositely displaced positions corresponding to reverse and low forward drive, and a second transmission shifting means, movable from an intermediate position corresponding to said neutral setting to oppositely displaced positions corresponding to intermediate and high forward drive, said mechanism comprising: at least one fixed planar member provided with two locking means spaced apart in the plane of said member; a selector lever movable parallel to the plane of said planar member; said selector lever being provided with two engaging means adapted respectively to engage said locking means; said selector lever being connected to said transmission shifting means by first and second linkages respectively attached to said lever substantially at the loci of said engaging means and to said first and second transmission shifting means; said lever being movable from a position corresponding to neutral only when one of said engaging means has been fully engaged by its corresponding locking means to provide a fulcrum about which said lever may rotate and to prevent the engaged engaging means from leaving neutral position; and spring means for urging said lever into a neutral position such that said second transmission shifting means will be shiftable while said first transmission shifting means will be prevented from leaving neutral position.

8. The mechanism of claim 7 wherein adjustable stops are provided to limit the movement of said lever when the second transmission shifting means is being shifted.

References Cited

UNITED STATES PATENTS

| 1,466,453 | 8/1923 | Manville | 74—477 |
| 2,690,684 | 10/1954 | Stemler | 74—477 |

FOREIGN PATENTS 488,971  12/1929  Germany.

MILTON KAUFMAN, *Primary Examiner.*